US007952465B2

(12) United States Patent
Sakamoto et al.

(10) Patent No.: US 7,952,465 B2
(45) Date of Patent: May 31, 2011

(54) WIRELESS TAG DETERMINATION SYSTEM AND WIRELESS TAG DETERMINATION METHOD

(75) Inventors: Kenji Sakamoto, Yokosuka (JP); Goro Kunito, Yokosuka (JP); Yoshinori Isoda, Yokohama (JP); Satoshi Tanaka, Yokohama (JP); Kenichi Yamazaki, Hino (JP)

(73) Assignee: NTT DoCoMo, Inc., Tokyo (JP)

( * ) Notice: Subject to any disclaimer, the term of this patent is extended or adjusted under 35 U.S.C. 154(b) by 443 days.

(21) Appl. No.: 11/677,307

(22) Filed: Feb. 21, 2007

(65) Prior Publication Data

US 2007/0205866 A1 Sep. 6, 2007

(30) Foreign Application Priority Data

Feb. 22, 2006 (JP) ............................... P2006-045910
Jun. 6, 2006 (JP) ............................... P2006-157367

(51) Int. Cl.
*H04Q 5/22* (2006.01)
*G08B 13/14* (2006.01)
*G05B 9/02* (2006.01)
*G01N 37/00* (2006.01)

(52) U.S. Cl. ......... 340/10.1; 340/572.1; 700/79; 702/81
(58) Field of Classification Search ............... 340/10.1, 340/825, 572.1, 568.1, 540, 500; 700/79, 700/1, 11, 21, 90, 306, 213, 231, 232, 236; 702/81, 1

See application file for complete search history.

(56) References Cited

U.S. PATENT DOCUMENTS

| | | | | |
|---|---|---|---|---|
| 7,019,642 B2* | 3/2006 | Nelson et al. | ............... | 340/539.1 |
| 7,116,230 B2* | 10/2006 | Klowak | ..................... | 340/572.1 |
| 7,161,487 B1* | 1/2007 | Tracey et al. | ............... | 340/572.1 |
| 7,161,489 B2* | 1/2007 | Sullivan et al. | ............ | 340/572.4 |
| 7,257,394 B2* | 8/2007 | Kikuta et al. | ................ | 455/415 |
| 7,527,198 B2* | 5/2009 | Salim et al. | ................... | 235/385 |
| 7,614,555 B2* | 11/2009 | Sullivan et al. | .............. | 235/451 |
| 7,633,392 B2* | 12/2009 | Neuwirth | ................... | 340/572.1 |
| 7,671,743 B2* | 3/2010 | Smith | ....................... | 340/572.1 |
| 7,673,039 B2* | 3/2010 | Sakamoto et al. | ........... | 709/224 |
| 2004/0099735 A1* | 5/2004 | Neumark | ...................... | 235/385 |
| 2004/0113791 A1* | 6/2004 | Salim et al. | ................ | 340/572.3 |
| 2005/0040974 A1* | 2/2005 | Shanks et al. | ................... | 341/53 |
| 2005/0093698 A1* | 5/2005 | Sakamoto et al. | ......... | 340/572.1 |
| 2005/0099295 A1* | 5/2005 | Sakamoto et al. | ........... | 340/540 |
| 2005/0103835 A1* | 5/2005 | Kunito et al. | ................ | 235/375 |

(Continued)

FOREIGN PATENT DOCUMENTS

JP  2004-286653  10/2004

(Continued)

OTHER PUBLICATIONS

Office Action issued Nov. 2, 2010 in Japanese Patent Application No. 2006-157367 (with English translation).

*Primary Examiner* — Brian A Zimmerman
*Assistant Examiner* — An T Nguyen
(74) *Attorney, Agent, or Firm* — Oblon, Spivak, McClelland, Maier & Neustadt, L.L.P.

(57) ABSTRACT

A wireless tag determination system includes a detection information storage configured to store information detected from a wireless tag by a tag reader, as detection information. A determination requesting unit is configured to request a determination for reliability of existence of the wireless tag within a detection range of the tag reader. A reliability determination unit is configured to determine the reliability by use of the detection information, in response to the request.

9 Claims, 13 Drawing Sheets

U.S. PATENT DOCUMENTS

| | | | |
|---|---|---|---|
| 2005/0144318 A1* | 6/2005 | Chang | 709/245 |
| 2005/0248452 A1 | 11/2005 | Nelson et al. | |
| 2006/0012480 A1* | 1/2006 | Klowak | 340/572.1 |
| 2006/0092040 A1* | 5/2006 | Fishkin et al. | 340/825.49 |
| 2007/0205866 A1* | 9/2007 | Sakamoto et al. | 340/10.1 |
| 2008/0231446 A1* | 9/2008 | Cresto | 340/572.1 |

FOREIGN PATENT DOCUMENTS

| | | |
|---|---|---|
| JP | 2005-149152 | 6/2005 |
| JP | 2005-520429 | 7/2005 |
| JP | 2006-48443 | 2/2006 |
| WO | WO 2005/111959 A2 | 11/2005 |

* cited by examiner

FIG. 2

| WIRELESS TAG IDENTIFIER | TAG READER IDENTIFIER | DETECTION TIME |
|---|---|---|
| 101 | 10 | 200501011000 |
| 102 | 10 | 200501011000 |
| 101 | 10 | 200501011001 |

FIG. 3

| WIRELESS TAG IDENTIFIER | PERIODICITY INFORMATION (sec) |
|---|---|
| 101 | 2.0 |
| 102 | 10.0 |
| 103 | 7.2 |

| WIRELESS TAG IDENTIFIER | ATTRIBUTE INFORMATION |
|---|---|
| 101 | PENCIL |
| 102 | PC |
| 103 | DESK |

FIG. 6

| ATTRIBUTE INFORMATION | MOBILITY PROBABILITY m |
|---|---|
| PENCIL | 0.5 |
| LAPTOP PC | 0.1 |
| DESK | 0.9 | ced
WIRELESS TAG DETERMINATION SYSTEM AND WIRELESS TAG DETERMINATION METHOD

CROSS REFERENCE TO RELATED APPLICATION

This application is based upon and claims the benefit of priority from prior Japanese Patent Applications P2006-45910 filed on Feb. 22, 2006, and P2006-157367 filed on Jun. 6, 2006; the entire contents of which are incorporated by reference herein.

BACKGROUND OF THE INVENTION

1. Field of the Invention

The present invention relates to a wireless tag determination system and a wireless tag determination method for determining reliability of existence of an object, to which a wireless tag is attached, within a detection range of a tag reader.

2. Description of the Related Art

Methods of finding reliability of measurement data by use of an update interval of a sensor have heretofore been proposed.

For example, the following system has been disclosed (see, for instance, Fujinami, Kaori, and Tatsuo Nakajima, "Framework for Constructing a Context-aware Application under Ubiquitous Environment," Proceedings of Computer System Symposium, pp. 91-98, 2002). In this system, the inverse number of an update interval of a sensor is defined as an index (a time precision) that represents the degree of reproducibility of measurement data. Thus, by regarding a higher time precision as the higher reproducibility of measurement data, the system determines that it is highly likely to obtain the same measurement data at the next time of polling the sensor.

Meanwhile, there is also disclosed a system for allowing reliability of point-of-interest (POI) data to be grasped by displaying information on the reliability of the POI data (see, for instance, Japanese Patent Application Laid-open No. 2004-286653).

However, the above-described method using the time precision as the index is focused only on the update interval of the sensor. For this reason, the reliability of measurement data cannot be obtained in a case, for example, where a tag reader cannot detect a wireless tag because of a surrounding radio wave environment even though the wireless tag exists within a detection range of the tag reader.

The reliability of the POI data needs to be set up for each piece of the POI data by a creator of a database or the like. It is difficult to set up the reliability for each of the large amount of pieces of POI data. In addition, reliability may vary because the reliability is determined from a subjective point of view of the creator of the database or the like, who sets up the POI data.

SUMMARY OF THE INVENTION

In view of the foregoing problems, an object of the present invention is to provide a wireless tag determination system and a wireless tag determination method, which can determine, with high accuracy, the reliability of existence of an object, to which a wireless tag is attached, within a detection range of a tag reader.

A first aspect of the present invention is a wireless tag determination system including, a detection information storage configured to store information detected from a wireless tag by a tag reader, as detection information, a determination requesting unit configured to request a determination for reliability of existence of the wireless tag within a detection range of the tag reader, and a reliability determination unit configured to determine the reliability by use of the detection information, in response to the request.

In the first aspect of the present invention, the wireless tag determination system may further include a periodicity information holder configured to hold periodicity information indicating a transmission cycle of the wireless tag, wherein the reliability determination unit may determine the reliability by further using the periodicity information.

In the first aspect of the present invention, the wireless tag determination system may further includes an attribute information holder configured to hold attribute information indicating an attribute of an object to which the wireless tag is attached, wherein the reliability determination unit may determine the reliability by further using the attribute information.

In the first aspect of the present invention, the reliability determination unit may include an elapsed time calculator configured to calculate elapsed time information indicating an elapsed time which is from a time of the last detection of the wireless tag to a time of the request, by use of the detection information, a non-detection frequency calculator configured to calculate, by use of the periodicity information, non-detection frequency information indicating the number of times that the wireless tag is not detected during the elapsed time, at time points when the wireless tag is supposed to be detected, and a reliability calculator configured to calculate the reliability in accordance with the non-detection frequency information.

In the first aspect of the present invention, the reliability determination unit may further includes a mobility probability determination unit configured to determine a mobility probability representing a frequency of movements of the object to which the wireless tag is attached, in accordance with the attribute information, wherein the reliability calculator may calculate the reliability by further using the mobility probability.

In the first aspect of the present invention, the reliability determination unit may further include a detection failure rate calculator configured to calculate a detection failure rate which is equivalent to a probability of failing to detect the wireless tag accurately in each transmission cycle, on the basis of the detection information and the periodicity information, wherein the reliability calculator may calculate the reliability by further using the detection failure rate.

In the first aspect of the present invention, the periodicity information holder may estimate the transmission cycle by use of the detection information, and may hold the estimated transmission cycle.

In the first aspect of the present invention, the detection information storage may further store electric power transmission interval information indicating a time interval for transmitting electric power from the tag reader to the wireless tag, and the reliability determination unit may determine the reliability by further using the electric power transmission interval information.

A second aspect of the present invention is a wireless tag determination method including the steps of, storing information detected from a wireless tag by a tag reader, as detection information, requesting a determination for reliability of existence of the wireless tag within a detection range of the tag reader, and determining the reliability by use of the detection information, in response to the request.

According to the present invention, it is possible to provide a wireless tag determination system and a wireless tag determination method which can determine the reliability of existence of an object, to which a wireless tag is attached, within a detection range of a tag reader at high accuracy.

BRIEF DESCRIPTION OF THE DRAWINGS

FIG. 2 is a schematic diagram showing an example of detection information to be stored in a detection information storage according to the first embodiment of the present invention.

FIG. 3 is a schematic diagram showing an example of periodicity information to be held by a periodicity information holder according to the first embodiment of the present invention.

FIG. 6 is a schematic diagram showing an example of a correspondence table to be held by a correspondence table holder according to the first embodiment of the present invention.

DETAILED DESCRIPTION OF THE INVENTION

Figure 1:
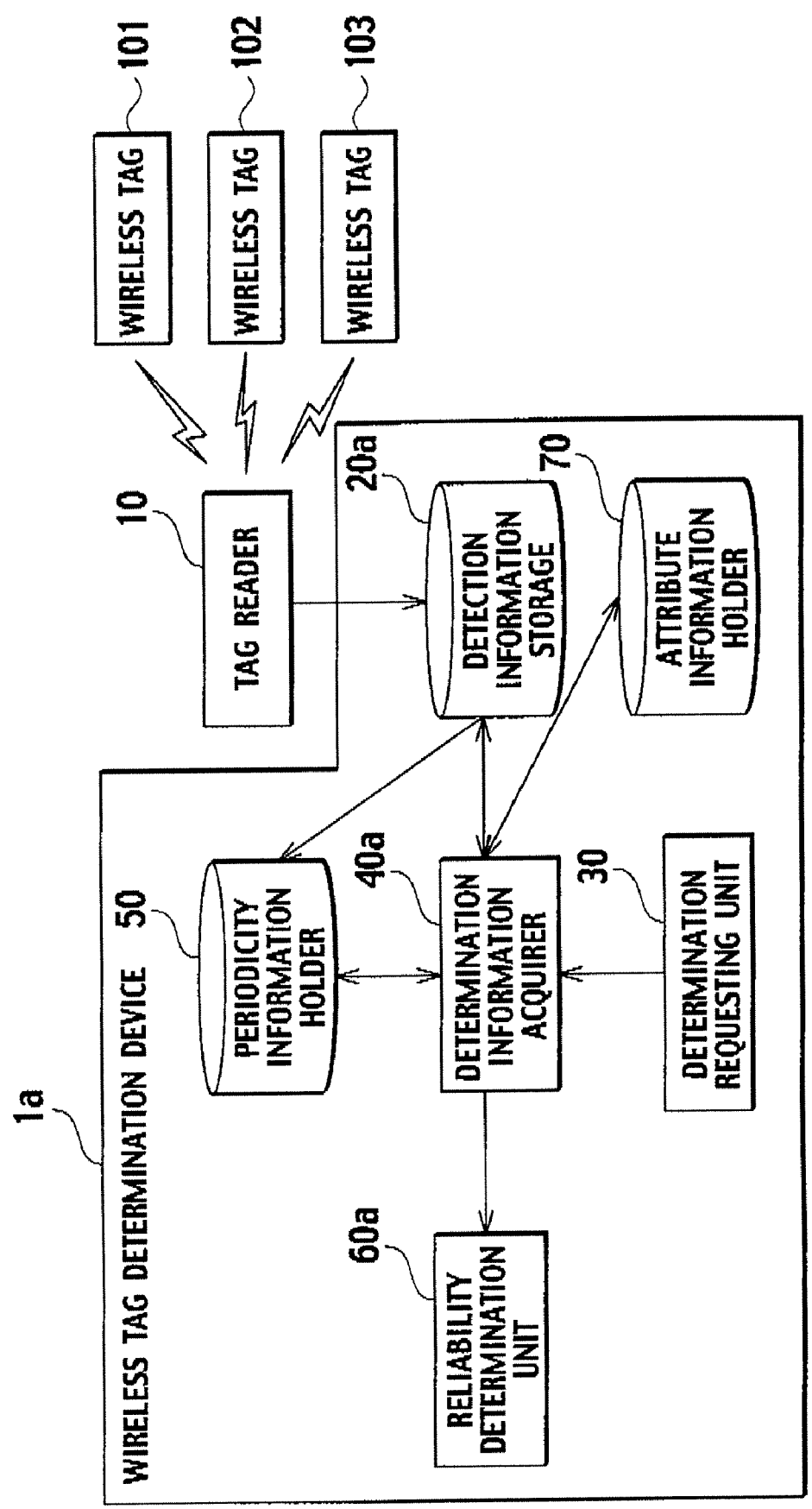
FIG. 1 is a block diagram showing an arrangement example of a wireless tag determination system according to a first embodiment of the present invention.

Hereinafter, first and second embodiments of the present invention will be described with reference to the accompanying drawings. In the drawings related to the first and second embodiments, identical or similar constituents are designated by identical or similar reference numerals.

First Embodiment

As shown in FIG. 1, a wireless tag determination system according to a first embodiment of the present invention includes a plurality of wireless tags 101, 102, and so on, a tag reader 10, and a wireless tag determination device 1a configured to determine reliability of existence of a desired wireless tag within a detection range of the tag reader 10. The "reliability" means certainty of existence of the desired wireless tag within the detection range of the tag reader 10.

Meanwhile, the "detection range" means a range where each of the wireless tags 101, 102, and so on can communicate with the tag reader 10. Hence, in a case of an active wireless tag which can perform autonomous transmission, the detection range corresponds to a range where the tag reader 10 can receive a certain level of radio wave from each of the wireless tags 101, 102, and so on. In contrast, in a case of a passive wireless tag configured to perform transmission upon receipt of electric power from a tag reader, the detection range corresponds to a range where each of the tags 101, 102, and so on can receive a certain level of radio wave from the tag reader 10. Here, the following first embodiment will be described on a case of using the active wireless tags.

Each of the wireless tags 101, 102 and so on contains a wireless tag identifier (hereinafter referred to as a "wireless tag ID") for uniquely identifying the wireless tag, and transmits a transmission signal at a predetermined frequency corresponding to the wireless tag ID at a constant period via a transmission antenna (not shown). The tag reader 10 receives the transmission signals transmitted at the constant period from the wireless tags 101, 102 and so on, and notifies the wireless tag determination device 1a of the wireless tag IDs together with its own tag reader identifier (hereinafter referred to as a "tag reader ID").

FIG. 1 illustrates the example of providing the single tag reader 10 which communicates with the wireless tag determination device 1a. Meanwhile, it is also possible to connect the plurality of tag readers 10 to the wireless tag determination device 1a.

The wireless tag determination device 1a includes a detection information storage 20a, an attribute information holder 70, a periodicity information holder 50, a determination information acquirer 40a, a determination requesting unit 30, and a reliability determination unit 60a.

The detection information storage 20a acquires the detected wireless tag IDs from the tag reader 10, and stores the information on the wireless tag IDs. When there is a notice from the determination information acquirer 40a concerning acquisition of detection information on a wireless tag which is a target of reliability determination (such a wireless tag will be hereinafter simply referred to as a "determination target wireless tag"), the detection information storage 20a notifies the determination information acquirer 40a of the detection information on the determination target wireless tag.

The detection information storage 20a includes an area for storing the wireless tag IDs, an area for storing the tag reader IDs, and area for storing times (herein after referred to as "detection time") at which the transmission signals are received from the wireless tags 101, 102 and so on. Specifically, as shown in FIG. 2, the detection information storage 20a stores the wireless tag IDs, the tag reader IDs and the detection time as being associated with one another.

An example in FIG. 2 indicates that the tag reader 10 shown in FIG. 1 detects the wireless tag 101 at 10:00, Jan. 1, 2005, detects the wireless tag 102 at 10:00, Jan. 1, 2005, and detects the wireless tag 101 at 10:01, Jan. 1, 2005.

The periodicity information holder 50 includes an area for storing the wireless tag IDs and an area for storing periodicity information. To be more precise, as shown in FIG. 3, the periodicity information holder 50 stores the wireless tag IDs and the periodicity information as being associated with each other.

An example in FIG. 3 indicates that the periodicity information on the wireless tag 101 is equivalent to 2.0 sec, the periodicity information on the wireless tag 102 is equivalent to 10.0 sec, and the periodicity information on the wireless tag 103 is equivalent to 7.2 sec.

Here, the periodicity information can be obtained by searching the periodicity information associated with the wireless tag ID of the determination target out of a database (not shown) for the periodicity information, the database being designed to store in advance the periodicity information for a corresponding one of the wireless tag IDs. For example, the database for the periodicity information may be set up by a manufacturer of the wireless tags, or by a user who purchases the wireless tags.

Figures 4, 5:
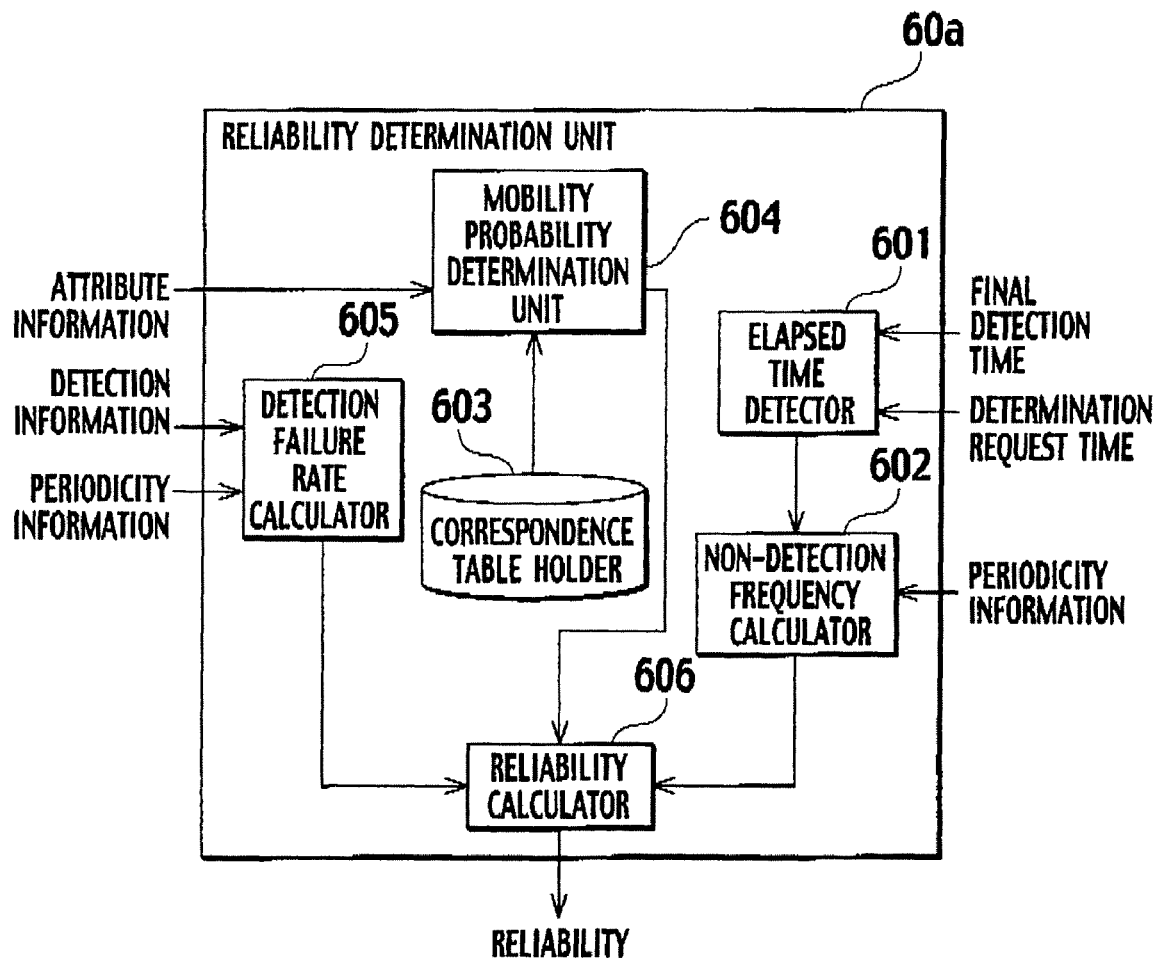
FIG. 4 is a schematic diagram showing an example of attribute information to be held by an attribute information holder according to the first embodiment of the present invention.
FIG. 5 is a block diagram showing an internal arrangement example of a reliability determination unit according to the first embodiment of the present invention.

The attribute information holder 70 shown in FIG. 1 includes an area for storing the wireless tag IDs and an area for storing attribute information indicating an attribute of an object to which the wireless tag is attached. Here, the "attribute of the object" means a type of object (an object name), for example. Moreover, when the determination information acquirer 40a issues an attribute information acquisition request, the attribute information holder 70 notifies the determination information acquirer 40a of the attribute information. As shown in FIG. 4, the attribute information holder 70 stores the wireless tag IDs and the attribute information as being associated with each other.

An example in FIG. 4 indicates that the attribute information on the wireless tag 101 is equivalent to "pencil," the attribute information on the wireless tag 102 is equivalent to "laptop PC," and the attribute information on the wireless tag 103 is equivalent to "desk."

Upon receipt of a determination request for reliability from a service provider or the like, the determination requesting unit 30 of FIG. 1 notifies the determination request acquirer 40a of the determination request.

Upon receipt of the determination request for determination target wireless tag from the determination requesting unit 30, the determination information acquirer 40a acquires the periodicity information, the detection information, and the attribute information on the determination target wireless tag from the periodicity information holder 50, the detection information storage 20a, and the attribute information holder 70, respectively. The reliability determination unit 60a is notified of the thus acquired periodicity information, the detection information, and the attribute information.

Upon acquisition of the periodicity information, the detection information, and the attribute information from the determining information acquirer 40a, the reliability determination unit 60a determines the reliability by use of the thus acquired periodicity information, the detection information, and the attribute information.

To be more precise, as shown in FIG. 5, the reliability determination unit 60a includes an elapsed time detector or calculator 601, a non-detection frequency calculator 602, a correspondence table holder 603, a mobility probability determination unit 604, a detection failure rate calculator 605, and a reliability calculator 606.

The elapsed time calculator 601 acquires a final detection time of the determination target wireless tag and a determination request time from the determination requesting unit 30, and calculates elapsed time information indicating elapsed time which is from a final time of detection of the wireless tag to a time of the determination request. The "final detection time" means the detection time closest to the determination request time. The elapsed time information calculated by the elapsed time calculator 601 is transmitted to the non-detection frequency calculator 602.

The non-detection frequency calculator 602 receives the elapsed time information and the periodicity information, and calculates non-detection frequency information indicating the number of times that the determination target wireless tag is not detected at times, during the elapsed time, when the determination target wireless tag is supposed to be detected. The non-detection frequency information is obtained, for example, by dividing the elapsed time by a transmission cycle. Specifically, when it is supposed that the elapsed time is defined as "x," and the transmission cycle is defined as "p," the non-detection frequency information is calculated by "x/p." In this way, the reliability can be determined by use of the detection information and the periodicity information on the wireless tag.

The correspondence table holder 603 stores the attribute information and a mobility probability m as being associated with each other. Here, the "mobility probability" means a frequency of motions of an object. A value of the mobility probability is smaller as the object moves frequently, and is larger when the object moves less frequently.

FIG. 6 shows an example of the correspondence table of the attribute information and the movable probabilities m. The table is held by the correspondence table holder 603. The example in FIG. 6 indicates that the mobility probability m of the pencil is equal to 0.5, the mobility probability of the laptop PC is equal to 0.1, and the mobility probability of a desk is equal to 0.9.

The movable probabilities in the correspondence table holder 603 may be input for each product by product vendors, or may be input by a user when attaching the wireless tag to the product.

The detection failure rate calculator 605 receives the detection information and the periodicity information on the determination target wireless tag and calculates a detection failure rate e representing a probability of failure to properly detect the determination target wireless tag.

The detection failure rate e is calculated on the basis of a history of the detection information and the periodicity information on the wireless tag. For example, if the wireless tag can only be detected nine times when the periodicity information indicates that the wireless tag needs to be detected ten times, then the detection failure rate is equal to 0.1.

If the tag reader 10 cannot receive the radio wave from the wireless tag because the wireless tag is attached to metal or the like, then the wireless tag can only be detected twice out of ten times, for example. In this case, the detection failure rate is approximately equal to 0.8.

The reliability calculator 606 calculates a "detection rate q" indicating a probability of detection of the wireless tag, by use of the mobility probability m and the detection failure rate e as follows:

$$q = m \cdot (1-e) \tag{1}$$

Subsequently, the reliability is calculated on the basis of the detection rate q and the non-detection frequency information. Here, when it is supposed that the non-detection frequency is defined as "x/p" and the detection rate is defined as "q", the reliability "r" is calculated as follows:

$$r = \begin{cases} 1 & (x = 0) \\ q(1-q)^{\frac{x}{p}-1} & (x = ap, a = 1, 2, 3, \ldots) \end{cases} \quad (2)$$

By use of the formula (2), the reliabilities respectively of the following cases are calculated, specifically, one of the calculated reliabilities is for a case where "x" is equal to 0, and another one of the reliabilities is for a case where "x" is equal to a natural number multiple of the transmission cycle of the wireless tag. The reliabilities of "x" in the rest of the cases are calculated by linear interpolation of the calculated values of the reliabilities.

Figure 7:
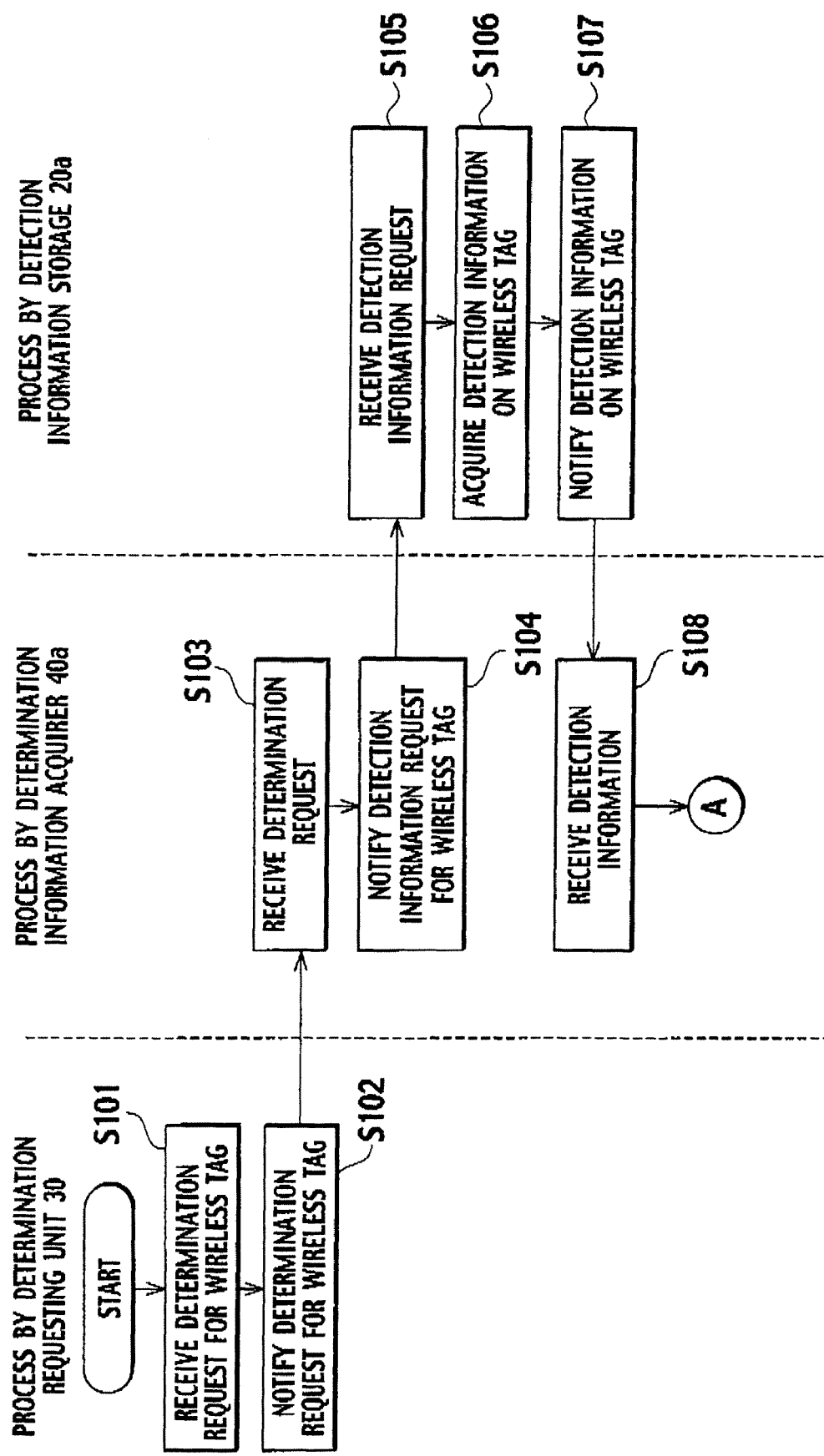
FIG. 7 is a first flowchart showing a wireless tag determination method according to the first embodiment of the present invention.
Figure 8:
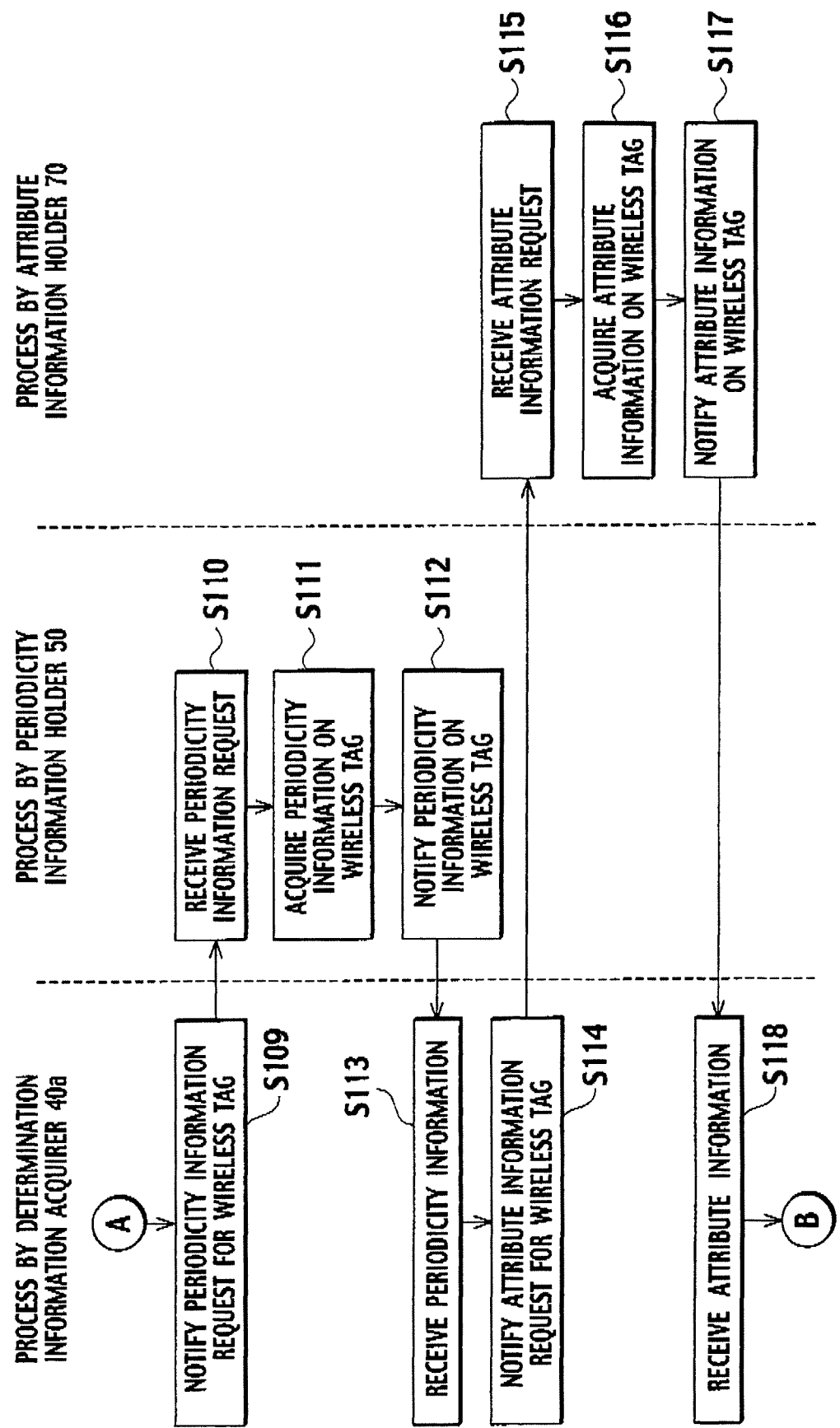
FIG. 8 is a second flowchart showing the wireless tag determination method according to the first embodiment of the present invention.
Figure 9:
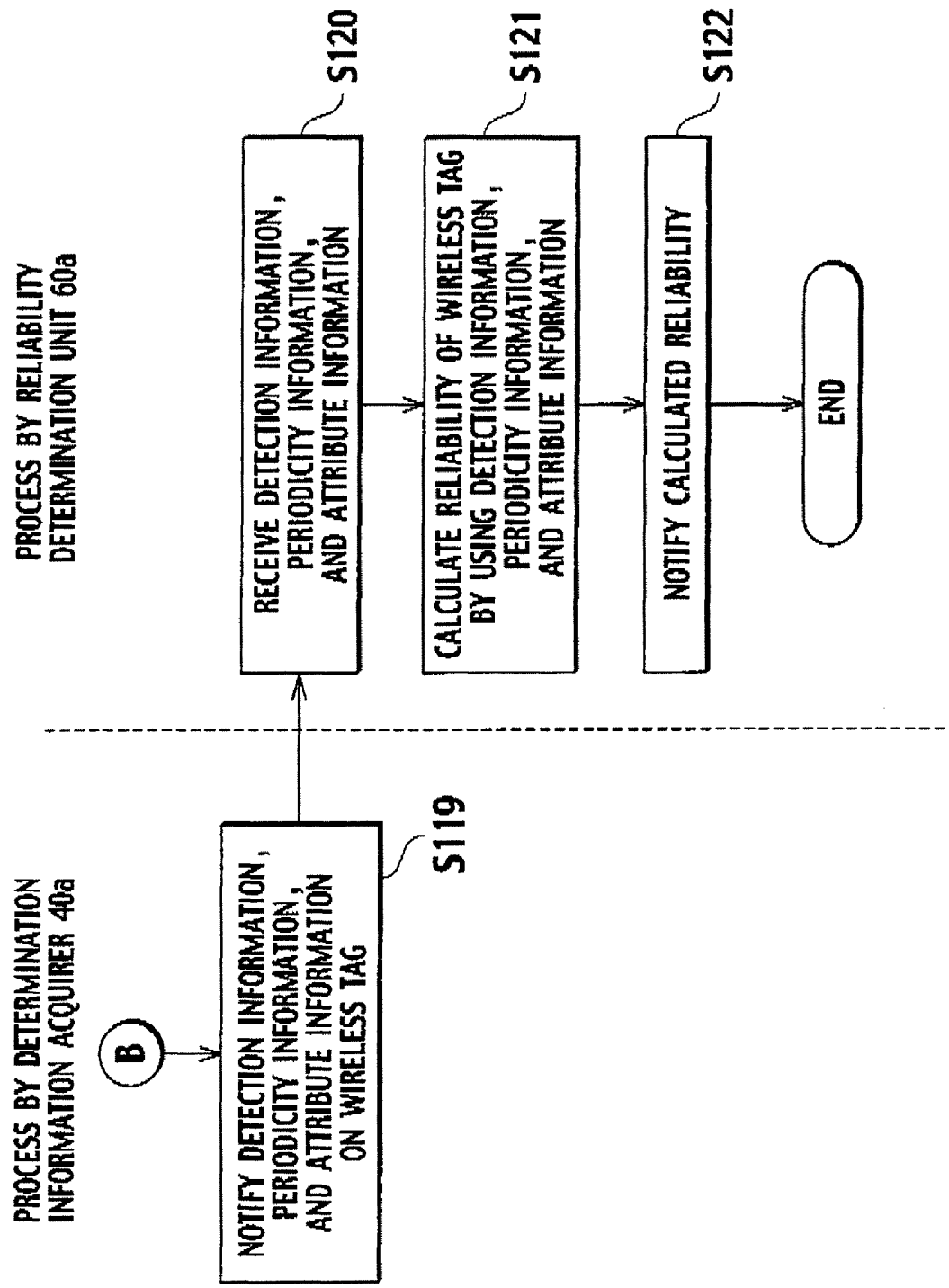
FIG. 9 is a third flowchart showing the wireless tag determination method according to the first embodiment of the present invention.

Next, with reference to flowcharts shown in FIG. 7 to FIG. 9, descriptions will be provided for a wireless tag determination method according to the first embodiment of the present invention.

In Step S101 of FIG. 7, the determination requesting unit 30 receives the determination request for reliability from a service provider or the like. In Step S102, the determination requesting unit 30 notifies the determination information acquirer 40a of the determination request for reliability.

In Step S103, the determination information acquirer 40a receives the determination request for reliability from the determination requesting unit 30. In Step S104, the determination information acquirer 40a notifies the detection information storage 20a of the detection information request for the determination target wireless tag.

In Step S105, the detection information storage 20a receives the detection information request for the determination target wireless tag from the determination information acquirer 40a. In Step S106, the detection information storage 20a searches the detection information on the determination target wireless tag. In step S107, the detection information storage 20a notifies the determination information acquirer 40a of the detection information acquired is Step S106.

In Step S108, the determination information acquirer 40a acquires the detection information from the detection information storage 20a. In Step S109 of FIG. 8, the determination information acquirer 40a notifies the periodicity information holder 50 of the periodicity information request for the determination target wireless tag.

In Step S110, the periodicity information holder 50 receives the periodicity information request from the determination information acquirer 40a. In Step S111, the periodicity information holder 50 searches the periodicity information on the determination target wireless tag. In Step S112, the periodicity information holder 50 notifies the determination information acquirer 40a of the periodicity information acquired in Step S111.

When the determination information acquirer 40a acquires, in Step S113, the periodicity information from the periodicity information holder 50, the determination information acquirer 40a notifies, in Step S114, the attribute information holder 70 of the attribute information request for the determination target wireless tag.

In Step S115, the attribute information holder 70 receives the attribute information request from the determination information acquirer 40a. In Step S116, the attribute information holder 70 searches the attribute information on the determination target wireless tag. In Step S117, the attribute information holder 70 notifies the determination information acquirer 40a of the attribute information acquired in Step S116.

In Step S118, the determination information acquirer 40a acquires the attribute information from the attribute information holder 70. In Step S119 in FIG. 9, the determination information acquirer 40a notifies the reliability determination unit 60a of the detection information, the periodicity information, and the attribute information.

In Step S120, the reliability determination unit 60a receives the detection information, the periodicity information, and the attribute information. In Step S121, the reliability determination unit 60a calculates the reliability by use of the detection information, the periodicity information, and the attribute information. In Step S122, the reliability determination unit 60a notifies the service provider or the like of the reliability calculated in Step S121, the service provider or the like being originally notified of the determination request.

Although the example has been described as one of the method in which the determination information acquirer 40a acquires the detection information, the periodicity information, and the attribute information in this order, it is to be noted that the order of acquisition of types of the information is not limited only to this example.

Figure 10:
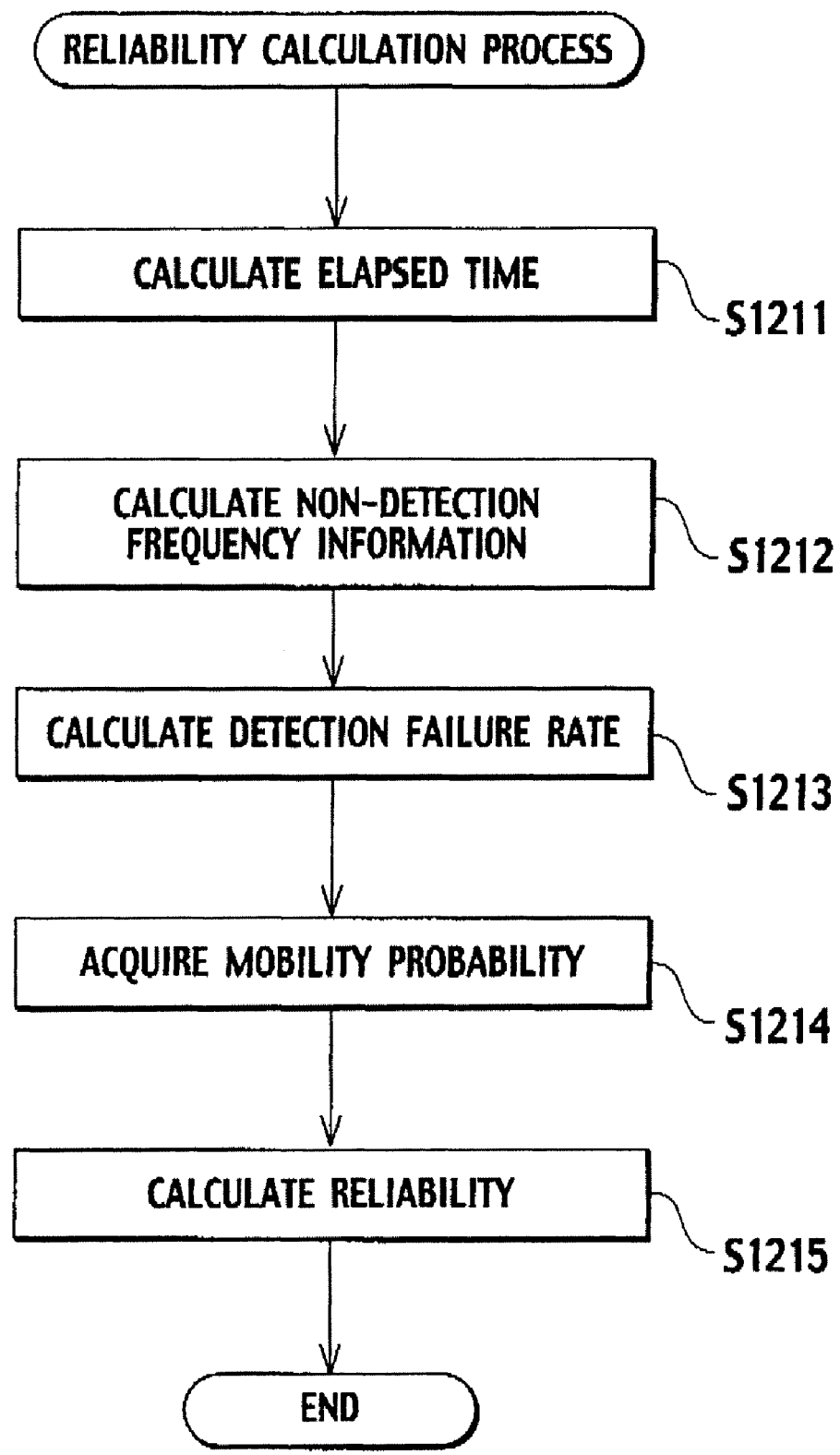
FIG. 10 is a flowchart showing details of a reliability calculation process in the wireless tag determination method according to the first embodiment of the present invention.

Next, details of Step S121 in FIG. 9 will be described with reference to a flowchart shown in FIG. 10.

In Step S1211, the elapsed time calculator 601 shown in FIG. 5 acquires the final detection time of the determination target wireless tag and the determination request time from the determination requesting unit 30, and calculates the elapsed time information indicating the elapsed time which is from the final time of detection of the determination target wireless tag to the time of determination request.

In Step S1212, the non-detection frequency calculator 602 calculates the non-detection frequency information based on the elapsed time information and the periodicity information.

In Step S1213, the detection failure rate calculator 605 calculates the detection failure rate e based on the detection information and the periodicity information on the determination target wireless tag.

In Step S1214, the mobility probability determination unit 604 acquires the mobility probability m associated with the attribute information from the correspondence table holder 603.

Incidentally, Step S1213 and Step S1214 may be executed in an inverted order, or may be executed prior to Step S1211.

In Step S1215, the reliability calculator 606 calculates the detection rate q for detecting the wireless tag, in accordance with the mobility probability m and the detection failure rate e by use of the formula (1). Moreover, the reliability calculator 606 calculates the reliability r based on the detection rate q and the non-detection frequency information.

As described above in detail, according to the wireless tag determination system of the first embodiment of the present invention, the wireless tag determination device 1a determines the reliability. The service provider or the like which provides a service by use of the detection information of the wireless tag refers to the value of reliability. Thereby, the service provider can obtain the information on certainty of existence of the determination target wireless tag within the detection range of the tag reader 110. Since the wireless tag determination system is configured to calculate the reliability by use of the detection information, the periodicity information, and the attribute information, it is possible to calculate the reliability with very high accuracy.

Modification of First Embodiment

In the above description of the first embodiment has been explained with the example in which the periodicity information holder 50 includes a database of the periodicity information configured to hold in advance the periodicity information for a corresponding one of the wireless tag IDs. However, as shown in FIG. 11, the periodicity information holder 50 according to a modification of the first embodiment of the present invention may be configured to estimate the transmission cycle by use of the detection information, and then to hold the estimated transmission cycle therein.

Figure 11:
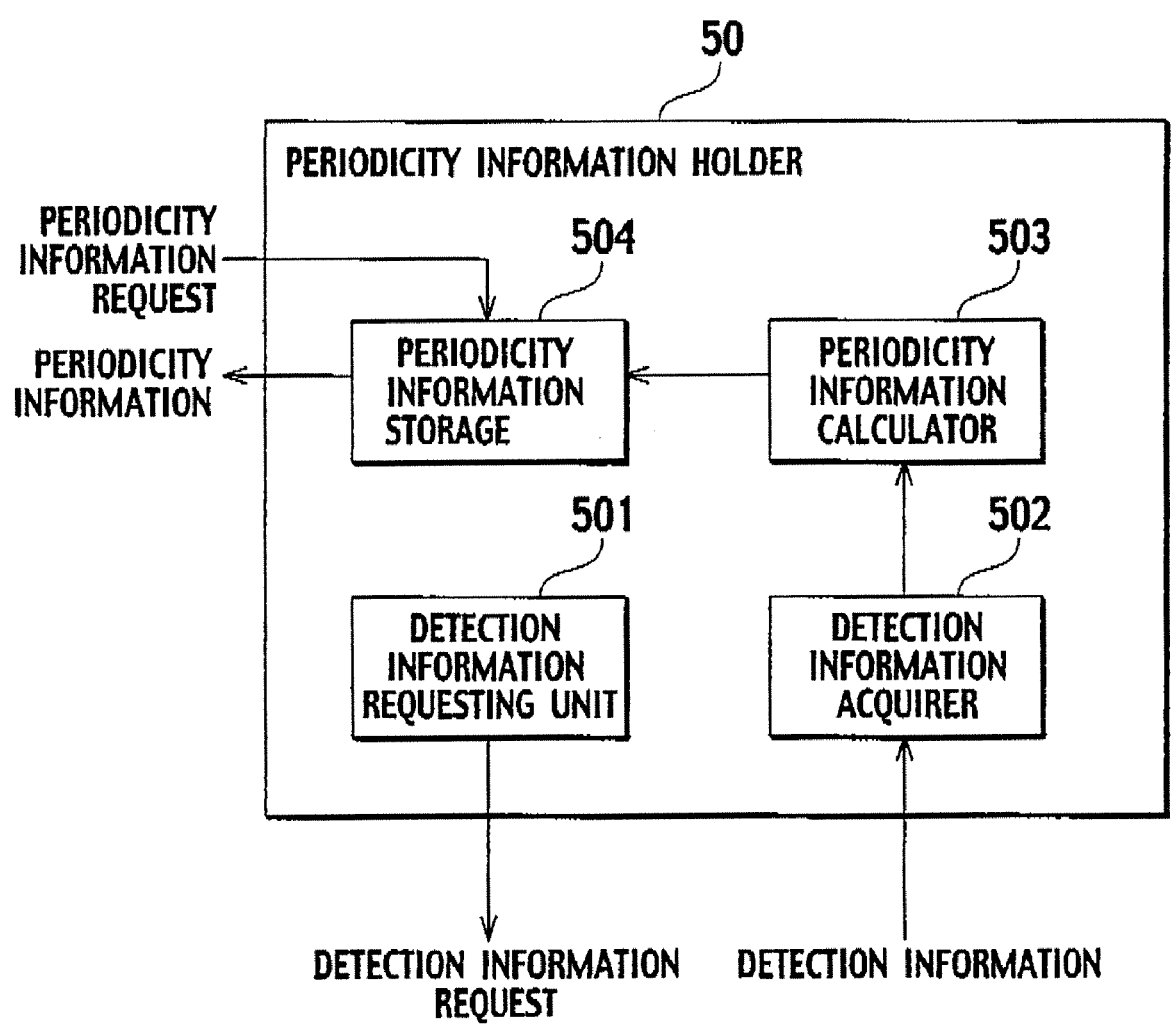
FIG. 11 is a block diagram showing an internal arrangement example of a periodicity information holder according to a modification of the first embodiment of the present invention.

The periodicity information holder 50 shown in FIG. 11 includes a detection information requesting unit 501, a detection information acquirer 502, a periodicity information calculator 503, and a periodicity information storage 504. The detection information requesting unit 501 periodically requests to the detection information storage 20a for the detection information on the wireless tag.

As a result, the detection information acquirer 502 acquires the detection information from the detection information storage 20a, and transmits the thus acquired detection information to the periodicity information calculator 503. The periodicity information calculator 503 estimates the periodicity information by use of the detection information.

As a method of estimating the periodicity information, it is possible to employ, for example, a method of calculating detection intervals of the wireless tag, and thus estimating an average value of the detection intervals as the periodicity information, or a method of calculating an intermediate value between a minimum value and a maximum value of the detection intervals and estimating this value as the periodicity information, for example.

The periodicity information storage 504 stores the periodicity information calculated by the periodicity information calculator 503. Moreover, when there is a detection information acquisition request from the determination information acquirer 40a, the periodicity information storage 504 notifies the determination information acquirer 40a of the periodicity information.

Figure 12:
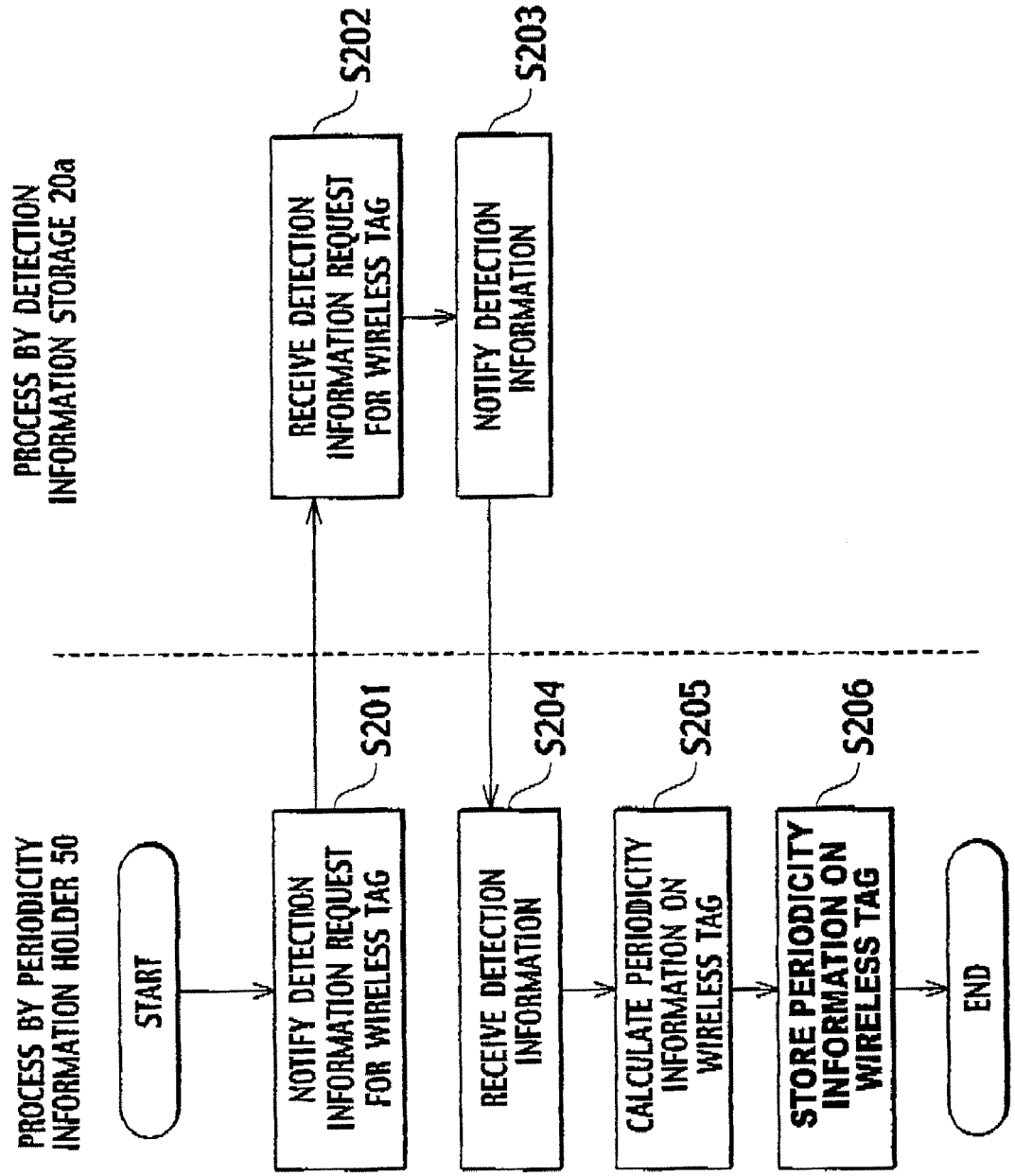
FIG. 12 is a flowchart showing a method of estimating a periodicity of a wireless tag according to the modification of the first embodiment of the present invention.

Next, with reference to a flowchart shown in FIG. 12, descriptions will be provided for a wireless tag periodicity estimation method according to the modification of the first embodiment of the present invention.

In Step S201, the detection information requesting unit 501 of the periodicity information holder 50 notifies the detection information storage 20a of the detection information request for the determination target wireless tag.

In Step S202, the detection information storage 20a receives the detection information request. In Step S203, the detection information storage 20a searches the detection information on the determination target wireless tag and notifies the periodicity information holder 50 of the thus searched detection information.

In Step S204, the detection information acquirer 502 of the periodicity information holder 50 receives the detection information. In Step S205, the periodicity information calculator 503 of the periodicity information holder 50 calculates the periodicity information on the determination target wireless tag. In Step S206, the periodicity information storage 504 of the periodicity information holder 50 stores the periodicity information calculated in Step S205.

According to the modification of the first embodiment of the present invention, it is possible to obtain the periodicity information without providing the database for the periodicity information configured to hold periodicity information for a corresponding one of the wireless tag IDs in advance.

Second Embodiment

The first embodiment has been described with the wireless tag determination system applicable to the active wireless tags. A second embodiment of the present invention will be described with a wireless tag determination system applicable to passive wireless tags. When employing the present invention to the passive wireless tags, the tag reader 10 transmits electric power (radio waves) at a predetermined time interval.

Figure 13:
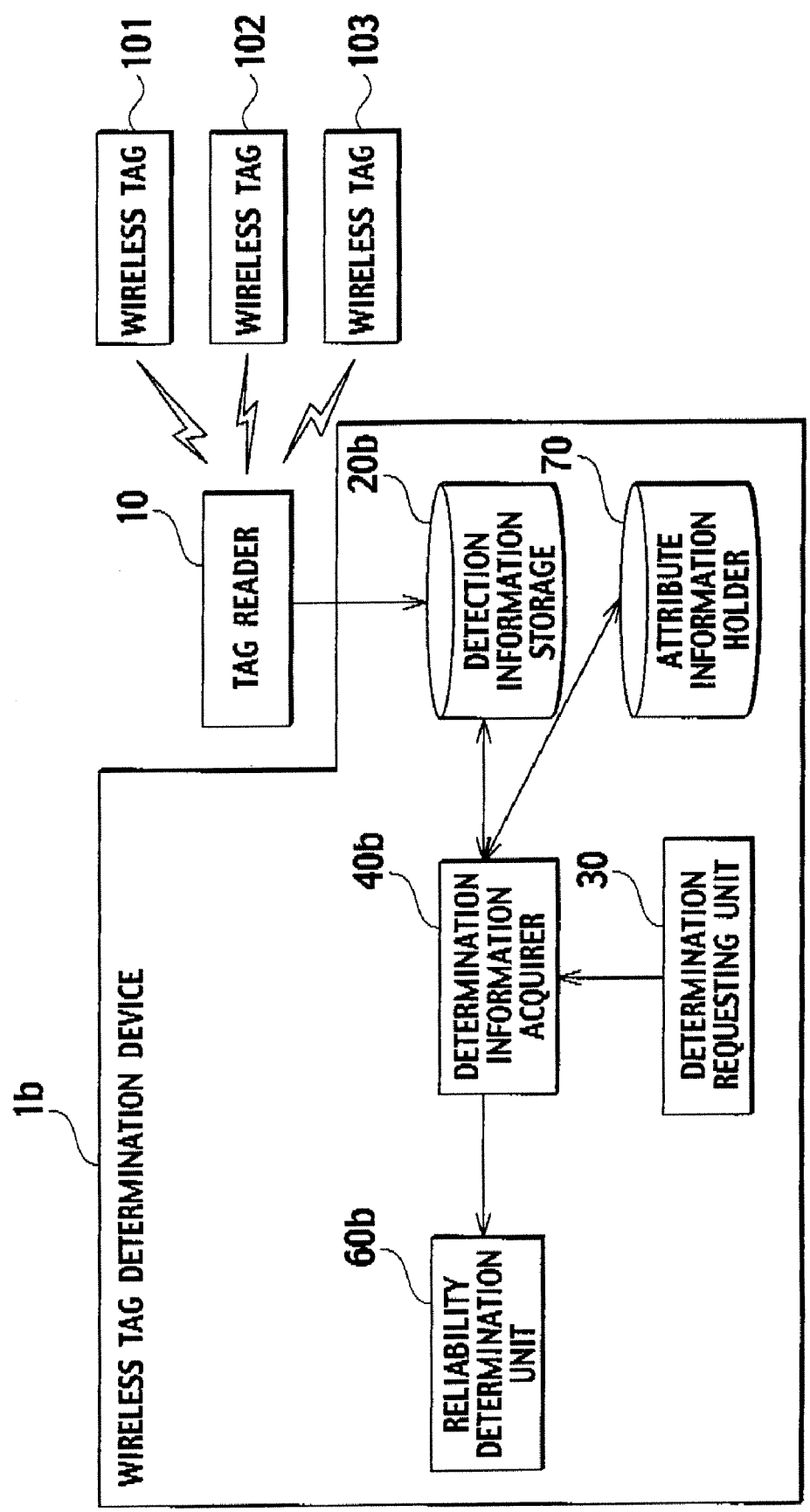
FIG. 13 is a block diagram showing a arrangement example of a wireless tag determination system according to a second embodiment of the present invention.

As shown in FIG. 13, a wireless tag determination device 1b according to the second embodiment of the present invention is different from the wireless tag determination device 1a shown in FIG. 1 in that the periodicity information holder 50 is not provided thereto.

Each of the wireless tags 101, 102 and so on generates electromotive force out of the radio wave from the tag reader 10, and transmits the wireless tag ID via a transmission antenna (not shown). The tag reader 10 receives the transmission signals transmitted from the wireless tags 101, 102 and so on, and notifies the wireless tag determination device 1b of the wireless tag IDs together with the tag reader ID and information on a transmission interval of the electric power (the radio waves) (hereinafter referred to as "electric power transmission interval information").

A detection information storage 20b acquires the detected wireless tag IDs from the tag reader 10, and stores the information in the wireless tag IDs. Moreover, the detection information storage 20b acquires the electric power transmission interval level information from the tag reader 10, and stores the electric power transmission interval information therein.

Moreover, when there is a notice of acquisition of the detection information on the determination target wireless tag, from a determination information acquirer 40b, the detection information storage 40b notifies the determination information acquirer 40b of the detection information on the determination target wireless tag and the electric power transmission interval information to.

Upon receipt of the determination request for determination target wireless tag, from the determination requesting unit 30, the determination information acquirer 40b acquires the detection information and the attribute information on the determination target wireless tag as well as the electric power transmission interval information on the tag reader 10, from the detection information storage 20b and the attribute information holder 70. A reliability determination unit 60b is notified of the acquired detection information, the attribute information, and the electric power transmission interval information.

Upon acquisition of the detection information, the attribute information, and the electric power transmission interval information from the determination information acquirer 40b, the reliability determination unit 60b determines the reliability by use of the acquired detection information, the attribute information, and the electric power transmission interval information. The reliability determination unit 60b is configured in a similar manner to that of FIG. 5. However, the reliability determination unit 60b is different from that of the configuration in FIG. 5 in that the electric power transmission interval information is input to the non-detection frequency calculator 602 and to the detection failure rate calculator 605, instead of the periodicity information.

Specifically, the non-detection frequency calculator 602 according to the second embodiment receives the elapsed time information and the electric power transmission interval information, and calculates the non-detection frequency information indicating the number of times that the determination target wireless tag is not detected at times, during the elapsed time, when the determination target wireless tag is supposed to be detected. In the meantime, the detection failure rate calculator 605 receives the detection information on the determination target wireless tag and the electric power transmission interval information, and calculates the detection failure rate e.

When it is supposed that the elapsed time is defined as "x," the electric power transmission interval is defined as "i," and the probability of detection of the wireless tag is defined as "q," the reliability is calculated as follows:

$$r = \begin{cases} 1 & (x = 0) \\ q(1-q)^{\frac{x}{i}-1} & (x = ap, a = 1, 2, 3, \ldots) \end{cases} \quad (3)$$

Other features and configurations of this embodiment are similar to those in the first embodiment. Accordingly, explanations thereof will be omitted herein.

Next, the wireless tag determination method according to the second embodiment of the present invention will be described with reference to flowcharts shown in FIG. 14 to FIG. 16.

Figure 14:
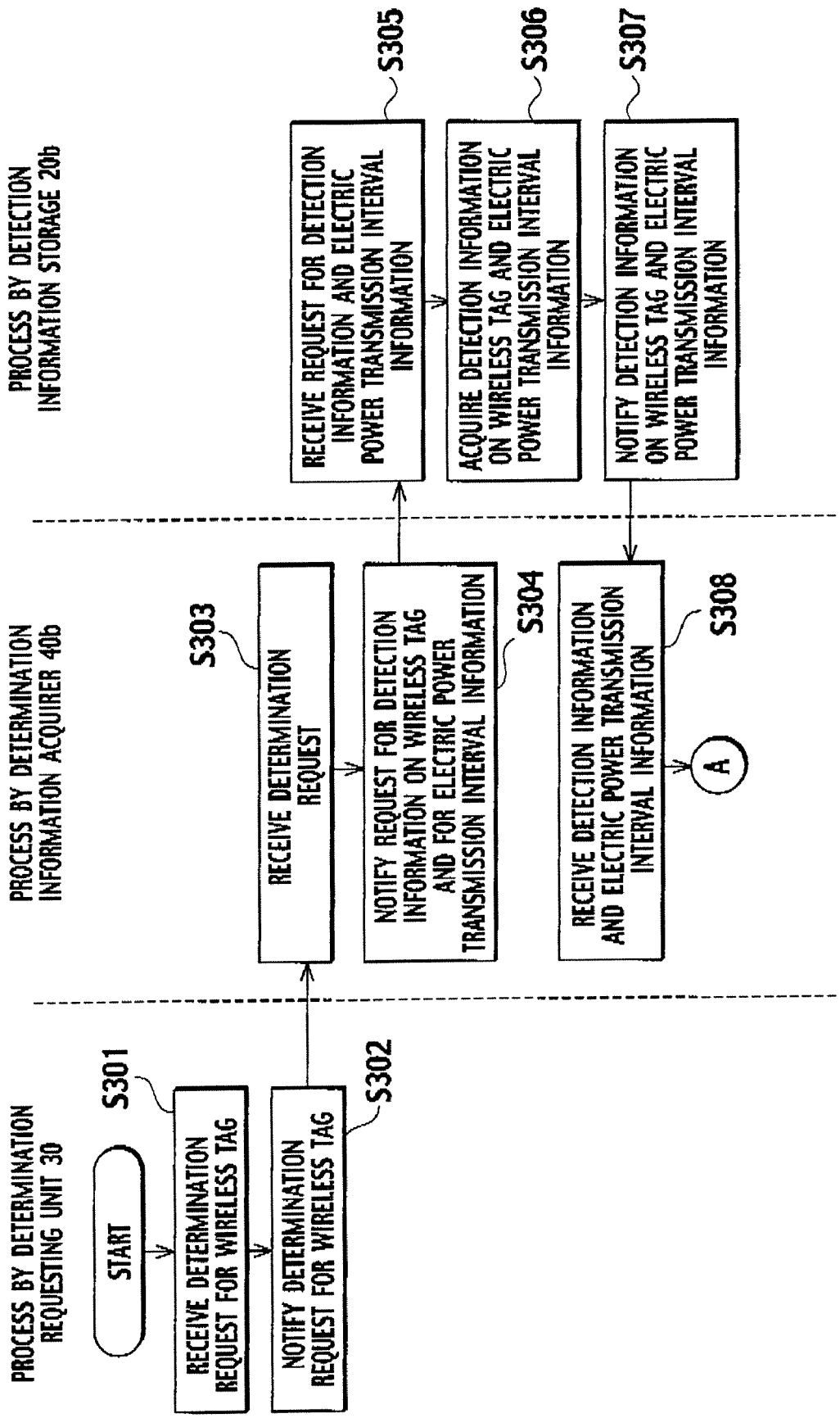
FIG. 14 is a first flowchart showing a wireless tag determination method according to the second embodiment of the present invention.

In Step S301 of FIG. 14, the determination requesting unit 30 receives the determination request for reliability from a service provider or the like. In Step S302, the determination requesting unit 30 notifies the determination information acquirer 40b of the determination request for reliability.

In Step S303, the determination information acquirer 40b receives the determination request for reliability from the determination requesting unit 30. In Step S304, the determination information acquirer 40b notifies the detection information storage 20b of a request for the detection information on the determination target wireless tag and for the electric power transmission interval.

In Step S305, the detection information storage 20b receives the request for the detection information on the determination target wireless tag and for the electric power transmission interval, from the determination information acquirer 40b. In Step S306, the detection information storage 20b searches the detection information on the determination target wireless tag. Moreover, the detection information storage 20b acquires the electric power transmission interval information on the tag reader 10. In Step S307, the detection information storage 20b notifies the determination information acquirer 40b of the detection information and the electric power transmission interval information acquired in Step S306.

In Step S308, the determination information acquirer 40b acquires the detection information and the electric power transmission interval information from the detection information storage 20b.

Figure 15:
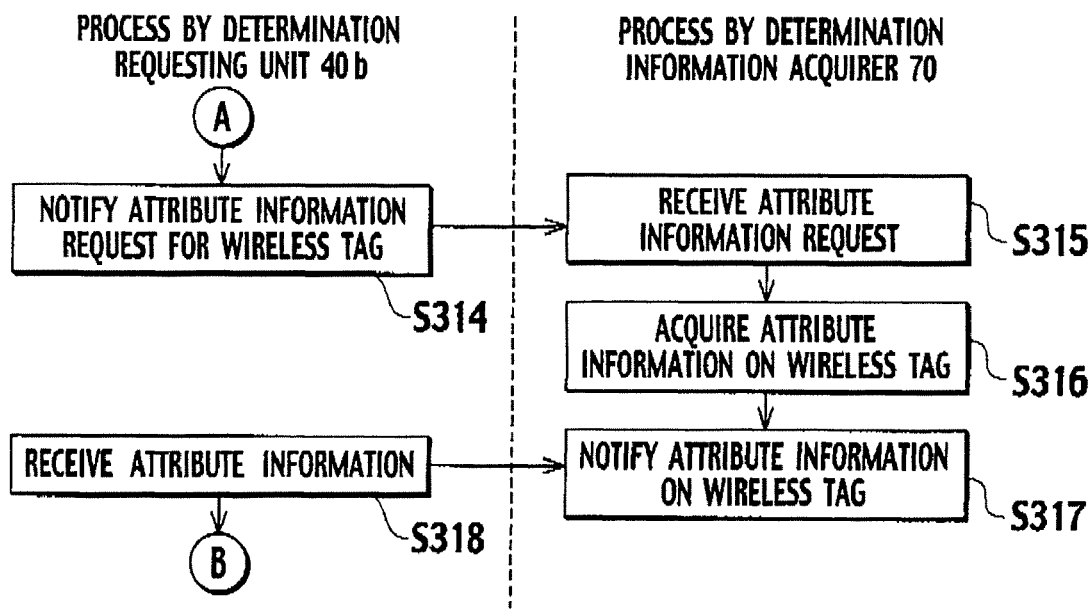
FIG. 15 is a second flowchart showing the wireless tag determination method according to the second embodiment of the present invention.
Figure 16:
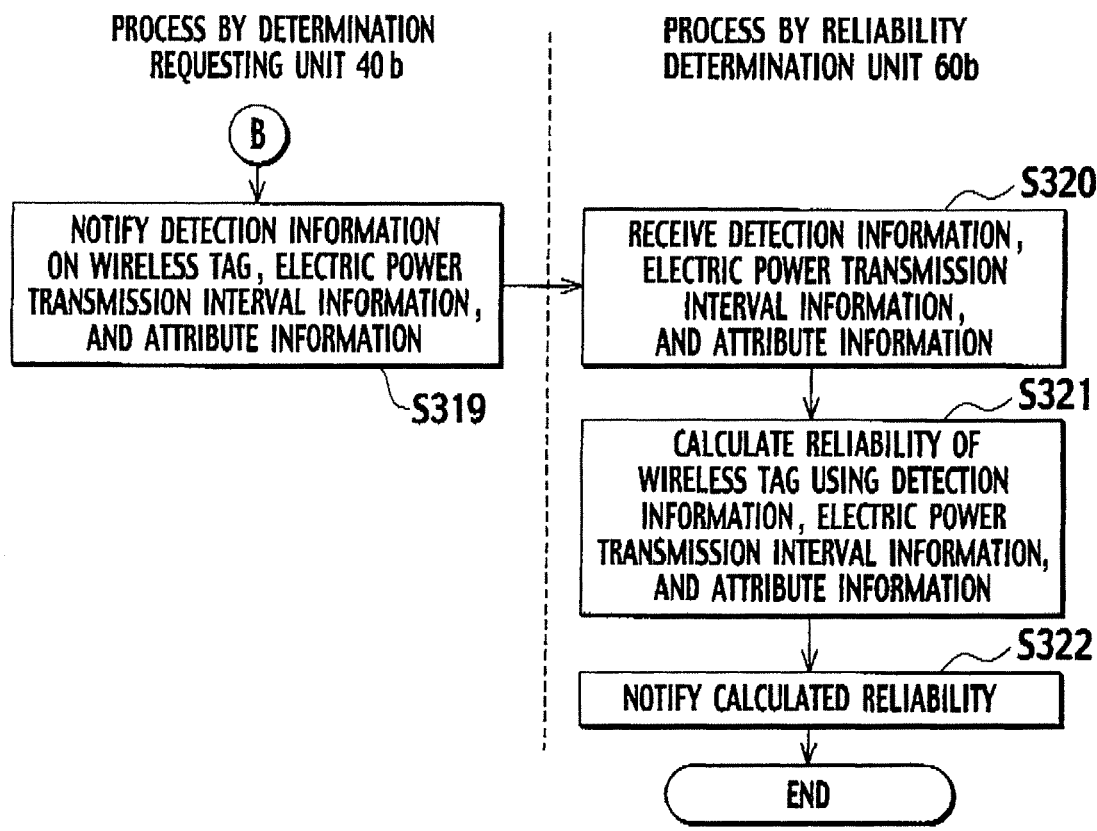
FIG. 16 is a third flowchart showing the wireless tag determination method according to the second embodiment of the present invention.

In Step S314 in FIG. 15, the determination information acquirer 40b notifies the attribute information holder 70 of the attribute information request for the determination target wireless tag.

In Step S315, the attribute information holder 70 receives the attribute information request from the determination information acquirer 40b. In Step S316, the attribute information holder 70 searches the attribute information on the determination target wireless tag. In Step S317, the attribute information holder 70 notifies the determination information acquirer 40b of the attribute information acquired in Step S316.

In Step S318, the determination information acquirer 40b acquires the attribute information from the attribute information holder 70. In Step S319 in FIG. 16, the determination information acquirer 40b notifies the reliability determination unit 60b of the detection information, the electric power transmission interval information, and the attribute information.

In Step S320, the reliability determination unit 60b receives the detection information, the electric power transmission interval information, and the attribute information. In Step S321, the reliability determination unit 60b calculates the reliability in accordance with the detection information, the electric power transmission interval information, and the attribute information, by use of the formula (3). In Step S322, the reliability determination unit 60b notifies the service provider or the like of the reliability calculated in Step S321, the service provider or the like being originally notified of the determination request.

As described above, according to the wireless tag determination system of the second embodiment of the present invention, the wireless tag determination system is configured to calculate the reliability by use of the detection information, the electric power transmission interval information, and the attribute information. Thus, it is possible to calculate the reliability with very high accuracy.

Other Embodiments

Although the present invention has been described above on the basis of the first and second embodiments, it is to be noted that the description and the drawings constituting part of this disclosure shall not limit the scope of this invention. It is obvious to those skilled in the art that various substitute embodiments, examples, and technical applications are possible from the teachings of this disclosure.

For example, it is possible to construct a wireless tag determination system in which the tag reader 10 for communicating with the wireless tag determination devices 1a and 1b is placed inside a refrigerator. Thereby, the system determines the reliability of the wireless tag attached to an object inside the refrigerator.

In such a system, a service provider or the like, which provides a service by use of the detection information of the wireless tag, sets up a threshold to be compared with the determined reliability. Thereby, the service provider makes a determination that it is highly likely that the object, to which the wireless tag is attached, exists inside the refrigerator, the wireless tag having the reliability exceeding the threshold. Accordingly, the service provider or the like can offer a recipe for a meal that a user can cook with the object which is highly likely to exist inside the refrigerator, for example.

In this service, it is possible to extract only the object that is actually likely to exist inside the refrigerator, by setting a threshold high.

Moreover, it is possible to construct a wireless tag determination system in which the tag reader 10 for communicating with the wireless tag determination devices 1a and 1b is disposed in a park or the like. Thereby, the system determines the reliability of the wireless tag attached to a person who visits the park.

In such a system, a service provider or the like preferably sets up a threshold to be compared with the determined reliability, and holds electric mail addresses of people who visit the park and the wireless IDs for the wireless tags attached to the people, as being associated with each other. Suppose that someone loses a wallet or the like in the park. In this case, on the basis of the reliability of each of the wireless tags, the service provider can transmit an electronic mail to all of the people who have had an opportunity to visit the park at the time when the wallet or the like was lost, the electronic mail being for inquiring whether any of the people has found the wallet or the like in the park.

In this service, it is possible to transmit the electronic mail to all of the people including those who have had only a slight chance to visit the park, by setting a low threshold.

In addition, by calculating the detection rate q for accurate detection of the wireless tag by use of the mobility probability m and the detection failure rate e, it is possible to construct a wireless tag determination system in which the tag reader 10 for communicating with the wireless tag determination devices 1a and 1b is disposed on a desk. Thereby, the system determines the reliabilities of the wireless tags attached to a pencil, a laptop PC, and a desktop PC, for example.

In such a system, the mobility probability m of the laptop PC is equal to 0.1 as shown in FIG. 6. For this reason, the laptop PC has a lower reliability than those of other objects. Here, the low reliability indicates that the laptop PC has a lower probability of existing within a detection area of the wireless tag reader at the time of the reliability determination because the laptop PC is often moved. For this reason, a service provider who wishes to know what is put on the desk can find out the objects actually placed on the desk, by excluding the objects having the lower reliabilities.

In this way, it is to be understood that the present invention also encompasses various other embodiments which are not expressly stated herein. Hence, the present invention shall be limited only by the matters defined by the appended claims which are appropriate from the disclosure of this invention.

What is claimed is:

1. A wireless tag determination system comprising:
a detection information storage configured to store a tag ID detected from a wireless tag by a tag reader and a time when the tag reader detects the tag ID, as detection information;
a reliability determination unit configured to determine reliability which indicates certainty of existence of the wireless tag within a detection range of the tag reader at a time subsequent to a time of an initial detection of the wireless tag; and
a determination requesting unit configured to request a reliability determination for reliability of existence of the wireless tag within a detection range of the tag reader, wherein
the reliability determination unit comprises an elapsed time calculator configured to calculate elapsed time information indicating an elapsed time which is from a time of the last detection of the wireless tag to a time when the determination requesting unit requests the reliability determination, by use of the detection information stored in the detection information storage;
a periodicity information holder configured to hold periodicity information indicating a transmission cycle of the wireless tag; and
an attribute information holder configured to hold attribute information indicating an attribute of an object to which the wireless tag is attached,
wherein the reliability determination unit includes,
a non-detection frequency calculator configured to calculate, by use of the periodicity information, non-detection frequency information indicating the number of times that the wireless tag is not detected during the elapsed time, at time points when the wireless tag is supposed to be detected,
a mobility probability determination unit configured to determine a mobility probability representing a frequency of movements of the object to which the wireless tag is attached, in accordance with the attribute information held by the attribute information holder, and
a reliability calculator configured to calculate the reliability in accordance with the elapsed time information calculated by the elapsed time calculator, the mobility probability determined by the mobility probability determination unit, the attribute information held by the attribute information holder, and the non-detection frequency information calculated by the non-detection frequency calculator.

2. The wireless tag determination system according to claim 1, wherein the reliability determination unit further comprises:
a detection failure rate calculator configured to calculate the detection failure rate which is equivalent to a probability of failing to detect the wireless tag accurately in each transmission cycle, on the basis of the detection information stored in the detection information storage and the periodicity information held by the periodicity information holder,
wherein the reliability calculator calculates the reliability by further using the detection failure rate calculated by the detection failure rate calculator.

3. The wireless tag determination system according to claim 1, wherein the periodicity information holder estimates the transmission cycle by use of the detection information stored in the detection information storage, and holds the estimated transmission cycle as the periodicity information.

4. The wireless tag determination system according to claim 1, wherein,
the detection information storage further stores electric power transmission interval information indicating a time interval for transmitting electric power from the tag reader to the wireless tag, and
the reliability determination unit determines the reliability by further using the electric power transmission interval information stored in the detection information storage.

5. The wireless tag determination system according to claim 4, further comprising:
an attribute information holder configured to hold attribute information indicating an attribute of an object to which the wireless tag is attached,
wherein the reliability determination unit determines the reliability by further using the attribute information held by the attribute information holder.

6. A wireless tag determination method comprising:
storing a tag ID detected from a wireless tag by a tag reader and a time when the tag reader detects the tag ID, as detection information;
requesting a reliability determination, which indicates certainty of existence of the wireless tag within a detection range of the tag reader at a time subsequent to a time of an initial detection of the wireless tag;
calculating elapsed time information indicating an elapsed time which is from a time of the last detection of the wireless tag to a time when the reliability determination is requested, by use of the detection information stored by the storing;
storing attribute information indicating an attribute of an object to which the wireless tag is attached,
storing periodicity information indicating a transmission cycle of the wireless tag; and
calculating, by use of the periodicity information, non-detection frequency information indicating the number of times that the wireless tag is not detected during the elapsed time, at time points when the wireless tag is supposed to be detected, determining a mobility probability representing a frequency of movements of the object to which the wireless tag is attached, in accordance with the attribute information, and calculating the reliability in accordance with the elapsed time information, the mobility probability, the attribute information, and the non-detection frequency information.

7. A wireless tag determination system comprising:

a detection information storage configured to store a tag ID detected from a wireless tag by a tag reader and a time when the tag reader detects the tag ID, as detection information;

a reliability determination unit configured to determine reliability which indicates certainty of existence of the wireless tag within a detection range of the tag reader at a time subsequent to a time of an initial detection of the wireless tag; and a determination requesting unit configured to request a reliability determination for reliability of existence of the wireless tag within a detection range of the tag reader, wherein the reliability determination unit comprises an elapsed time calculator configured to calculate elapsed time information indicating an elapsed time which is from a time of the last detection of the wireless tag to a time when the determination requesting unit requests the reliability determination, by use of the detection information stored in the detection information storage;

a periodicity information holder configured to hold periodicity information indicating a transmission cycle of the wireless tag; and an attribute information holder configured to hold attribute information indicating an attribute of an object to which the wireless tag is attached, wherein the reliability determination unit includes, a non-detection frequency calculator configured to calculate, by use of the periodicity information, non-detection frequency information indicating the number of times that the wireless tag is not detected during the elapsed time, at time points when the wireless tag is supposed to be detected, a detection failure rate calculator configured to calculate the detection failure rate which is equivalent to a probability of failing to detect the wireless tag accurately in each transmission cycle, on the basis of the detection information stored in the detection information storage and the periodicity information held by the periodicity information holder, and a reliability calculator configured to calculate the reliability in accordance with the elapsed time information calculated by the elapsed time calculator, the detection failure rate calculated by the detection failure rate calculator, the attribute information held by the attribute information holder, and the non-detection frequency information calculated by the non-detection frequency calculator.

8. The wireless tag determination system according to claim 1, wherein the non-detection frequency information indicating the number of time the wireless tag is not detected during the elapsed time is 1−q, where "q" is the detection rate, q=m*(1−e), "m" is the mobility probability, and "e" is a detection failure rate.

9. The wireless tag determination system according to claim 8, wherein the reliability determination unit determines the reliability "r" according to $$r = q(1-q)^{\frac{x}{p}-1},$$

where x=ap, a=1, 2, 3, . . . , and p is the periodicity.

* * * * *